United States Patent [19]

Papa et al.

[11] 4,119,584

[45] Oct. 10, 1978

[54] PHENOLIC FOAM MODIFIED WITH PHOSPHORUS-CONTAINING ISOCYANATE-TERMINATED PREPOLYMERS

[75] Inventors: Anthony Joseph Papa, Saint Albans; Richard Lee Rollins, South Charleston; Frank Edward Critchfield, Charleston, all of W. Va.

[73] Assignee: Union Carbide Corporation, New York, N.Y.

[21] Appl. No.: 781,162

[22] Filed: Mar. 25, 1977

[51] Int. Cl.$^2$ .................. C08G 18/24; C08G 18/50
[52] U.S. Cl. ................ 521/127; 260/18 TN; 521/132; 521/136; 521/159
[58] Field of Search ............ 260/2.5 AM, 2.5 AP, 260/2.5 AR, 2.5 AB, 2.5 AJ

[56] References Cited

U.S. PATENT DOCUMENTS

| | | | |
|---|---|---|---|
| 2,806,006 | 9/1957 | Proctor | 260/2.5 AM |
| 3,063,964 | 11/1962 | Khawam | 260/2.5 AM X |
| 3,099,676 | 7/1963 | Lanham | 260/2.5 AR X |
| 3,144,419 | 8/1964 | Guttag | 260/2.5 AR |
| 3,271,331 | 9/1966 | Ender | 260/2.5 F |
| 3,298,973 | 1/1967 | Quarles et al. | 260/2.5 F |
| 3,393,254 | 7/1968 | Hartman et al. | 260/2.5 AR X |
| 3,439,067 | 4/1969 | Austin et al. | 260/2.5 AR X |
| 3,632,531 | 1/1972 | Rush et al. | 260/2.5 AJ |
| 3,637,542 | 1/1972 | Doerge et al. | 260/2.5 AR X |
| 3,682,845 | 8/1972 | Longley et al. | 260/2.5 AP |
| 3,732,187 | 5/1973 | Cenker et al. | 260/2.5 AE X |
| 3,770,671 | 11/1973 | McFarling | 260/2.5 AP |
| 3,872,034 | 3/1975 | Dickert | 260/2.5 AM |
| 4,013,701 | 3/1977 | Jabs et al. | 260/2.5 A |

FOREIGN PATENT DOCUMENTS

| | | | |
|---|---|---|---|
| 879,745 | 8/1971 | Canada | 260/2.5 AM |
| 908,303 | 10/1962 | United Kingdom. | |

*Primary Examiner*—H.S. Cockeram
*Attorney, Agent, or Firm*—Richard J. Gallagher

[57] ABSTRACT

This invention provides a low density (<2 pcf.) modified phenolic foam produced by combining a resole resin with a phosphorus-containing isocyanate-terminated prepolymer in the presence of a minor amount of a surfactant, a catalytic amount of an organotin catalyst, and a halocarbon blowing agent. Foam products produced by the method of the invention have a good combination of low combustibility, friability resistance and compressive strength.

14 Claims, No Drawings

PHENOLIC FOAM MODIFIED WITH PHOSPHORUS-CONTAINING ISOCYANATE-TERMINATED PREPOLYMERS

FIELD OF THE INVENTION

The present invention relates to phenolic "resole" foam modified by incorporation therein of particular isocyanate-terminated prepolymers.

BACKGROUND AND DESCRIPTION OF THE PRIOR ART

Heretofore, the dichotomy has existed between urethane foams, which exhibit excellent mechanical properties (e.g. compressive strength) but are extremely flammable and produce smoke, and phenolic "resole" foams, which exhibit low combustibility and smoke but have low compressive strength and are extremely friable. Accordingly, it is desirable to provide phenolic foam having improved properties such as friability resistance and compressive strength without adversely affecting the otherwise low combustibility of phenolic foam.

Modification of phenolic foams by the incorporation of isocyanates is known in the art. For example, U.S. Pat. No. 3,872,034 discloses a phenolic foam produced by the combined reaction of a resole resin, an alkylene glycol, a phosphate flame retardant, an organotin catalyst, a silicone surfactant, an isocyanate, and a blowing agent.

U.S. Pat. No. 2,608,536 discloses the preparation of foams by heating at 150°–250° C. a mixture of resole resin, diisocyanate, surfactant, and nitrogenous blowing agent. The requirement that the mixture be heated to 150°–250° C. is inherently expensive and requires the use of special equipment for high temperature heating. Further, U.S. Pat. No. 3,298,973 discloses flame-resistant, nonpunking phenolic foams produced by oven-curing the resole in the presence of acids, an organic blowing agent, and a surfactant. The use of polyisocyanates in the production of phenolic foams is also disclosed in that patent. However, that patent uses heat curing which, as noted, is inherently expensive.

Other prior art relating to the use of an isocyanate component in the formation of phenolic foams includes:

(1) U.S. Pat. No. 2,806,006 which discloses the preparation of foam by reacting a resole resin comprising 78–85 wt. percent of the mixture with 0.5 to 10 wt. percent of an isocyanate-terminated prepolymer under heat in the presence of a blowing agent and an acid catalyst.

(2) British Pat. No. 908,303 which discloses the production of high density phenolic foams by reacting a resole resin with an isocyanate in the presence of an acid catalyst and water.

(3) U.S. Pat. No. 3,632,531 which relates to the preparation of foams by the reaction of an aromatic isocyanate with a resole resin to form a flame-retardant, heat-resistant foam. However, compressive strength is not mentioned in the patent.

None of the above-mentioned patents, however, relate to the use of phosphorus-containing isocyanate-terminated prepolymers which are employed in accordance with the teachings of this invention to provide phenolic foam of low combustibility having a good combination of friability resistance and compressive strength.

SUMMARY OF THE INVENTION

In accordance with the teachings of the present invention, the present invention relates to a process for producing a rigid phenolic foam having a density of up to about 2 pcf. and is prepared by the method which comprises reacting and foaming a reaction mixture containing:

(a) a liquid phenol-aldehyde resole having a viscosity from 200 to 500,000 centipoises at 25° C., (b) from 35 to 75 parts by weight of a phosphorus-containing isocyanate-terminated prepolymer per hundred parts of said resole and said isocyanate-terminated prepolymer, (c) a catalytic amount of an organotin catalyst for the curing of the reaction mixture to produce the elastomer, (d) from 0.5 to 5.0 parts by weight of a surface active agent per hundred parts of said resole and said isocyanate-terminated prepolymer, and (e) a halocarbon blowing agent in an amount sufficient to produce a cellular structure in the foam.

DETAILED DESCRIPTION OF THE INVENTION AND PREFERRED EMBODIMENTS

The phenol-aldehyde condensation products employed in this invention are not narrowly critical and are well known in the art for making phenolic foams. They are commonly called one-step resins or "resoles", being the condensation reaction products of a monohydric phenol and an aldehyde. Preferred are the resins of phenol per se and formaldehyde although other phenols such as resorcinol; catechol; ortho, meta, and para-cresols; 2,5-, 3,4- and 3,5-xylenols; 3-ethylphenol; 3,5-diethylphenol; and conventional para-substituted alkyl phenols such as p-tert-butylphenol, p-amylphenol; p-nonylphenol, p-dodecylphenol, p-tetradecylphenol, p-octadecylphenol; and the like. Similarly, the formaldehyde can be replaced by other aldehydes known to the art of phenolic foam formation. Illustrative of such other aldehydes are: glyoxal, acetaldehyde, chloral, furfural, and benzaldehyde. Further, formaldehyde may be used as free formaldehyde, usually added in aqueous solution, or in the form of its low molecular weight polymers such as paraformaldehyde or in the form of other substances capable of providing free formaldehyde. It is to be understood that any of the aforesaid aldehydes including formaldehyde may be used individually or in combination.

The liquid resole resins are the alkaline-catalyzed condensates which are carried to only a mild state of resinification so that they are normally liquid and generally water-soluble. This is often referred to as the "A" state of resinification, the "C" stage being the fully cured thermoset resin stage.

As the condensation between the phenol and aldehyde progresses from the liquid low molecular weight resins, the molecular weight of the condensation product increases and the resin exhibits a corresponding increase in viscosity. Since the addition of small amounts of the blowing agent may increase or decrease the viscosity of the liquid resins, the viscosity of the foamable composition is not narrowly critical, but is dependent to a degree on the amount and type of blowing agent present. Typical foamable resole compositions employable herein would include those which have an initial viscosity at 25° C. ranging from about 200 centipoises to about 500,000 centipoises, with those having a viscosity ranging from about 400 to about 25,000 centipoises being preferred for processing and handling purposes.

Minor amounts of water can be tolerated in these resins although it is preferred that water content be kept to less than 10% by weight of resin.

It is contemplated in the invention that any resole resin either initially liquid or made fluid by the addition of any agent or by any technique can be employed in this invention.

The phosphorus-containing isocyanate-terminated prepolymer useful in the process of the present invention provides flame resistance for the resulting foam and is used to complete the reaction of the desired phenolic resin. The useful isocyanate prepolymer is an isocyanate terminated urethane prepolymer prepared from polyfunctional isocyanates and phosphorus-containing polyols. This isocyanate prepolymer is prepared from a polyisocyanate and a phosphate polyol. Suitable polyisocyanates are those represented by the general formula:

$$Q(NCO)_i$$

wherein: $i$ has an average value of at least two and is usually no more than six, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen- and alkoxy-substituted radicals. Typical examples of such polyisocyanates useful in the invention are any of the following including mixtures thereof: 1,6-hexamethylenediisocyanate; 1,4-tetramethylenediisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyldiisocyanate; durylene diisocyanate; and triphenylmethane-4,4',4"-triisocyanate. Of the aforementioned polyisocyanates, tolylene diisocyanate is generally preferred.

Also useful as polyisocyanate reactants are polymeric isocyanates having units of the formula:

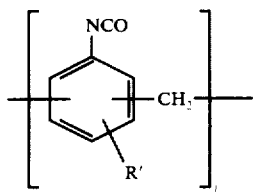

wherein R' is hydrogen and/or lower alkyl and $j$ has an average value of at least 2.1. Usually, the lower alkyl radical is methyl and $j$ has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoises at 25° C.) liquids having average isocyanate functionalities in the range of about 2.25 to about 3.2 or higher, and free -NCO contents of from about 25 to about 35 weight percent, depending upon the specific aniline-to-formaldehyde molar ratio used in the polyamine preparation. Suitable polymeric isocyanates of this type for use in the practice of this invention are those available commercially as PAPI 901 (The Upjohn Company) and NIAX Isocyanate AFPI (Union Carbide Corporation).

Useful phosphate polyols are those represented by the formula

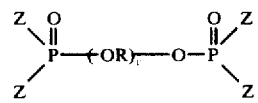

wherein R represents the divalent residue of a vicinal epoxide, wherein $y$ represents a number that has a value of at least 1, and wherein each Z individually represents a group selected from the class consisting of

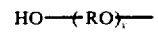

wherein R and $y$ have the significance stated above, and

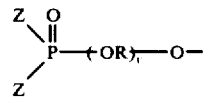

wherein the variables Z, R, and $y$ are defined above. These phosphate polyols are further described in U.S. Pat. No. 3,099,676, patented July 30, 1963, the teachings of which are incorporated herein by reference.

A preferred class of phosphate polyols is composed of a plurality of pentavalent phosphorus atoms, wherein each of said phosphorus atoms is bonded to one oxy group, wherein each phosphorus atom is interconnected to at least one other phosphorus atom through a group that is represented by the formula

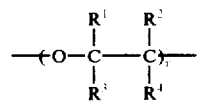

wherein each of the variables designated as $R^1$, $R^2$, $R^3$, and $R^4$ represents a member selected from the group consisting of hydrogen, alkyl, alkenyl, chloroalkyl, bromoalkyl, chloroalkenyl, phenyloxyalkyl and two of the variables designated as $R^1$—$R^4$ taken together, form a cycloalkyl group, and wherein $y$ represents a number having a value of at least 1, and wherein each of the remaining valence bonds of each phosphorus atom of the phosphate polyol is bonded to a group that is represented by the formula

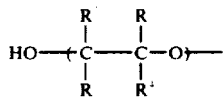

wherein the variables $R^1$, $R^2$, $R^3$, $R^4$, and $y$ are defined above. In general, the number of carbon atoms present in each of $R^1$—$R^4$ is no more than about 10 and is usually no more than 8. In the most preferred embodiment, $R^1$—$R^4$ are lower alkyl groups of 1 to 4 carbon atoms. The most preferred phosphate polyol is an oxypropylated phosphoric acid comprised of units of the formula

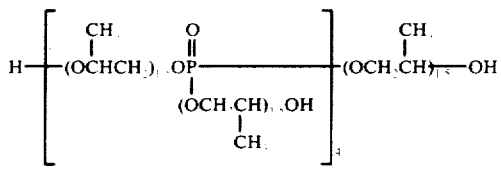

Although the complexity of this oxypropylated phosphoric acid does not permit full elucidation of its structure, five-membered ring phosphates are also present on the polymer chain.

Although the amount of isocyanate prepolymer by weight based on the combined weight of resole resin and isocyanate prepolymer is not narrowly critical, a preferred range is from about 35 to about 75 parts by weight of isocyanate prepolymer per 100 parts by weight of resole resin and isocyanate prepolymer. The resole resin is preferably employed in the range of about 65 to about 25 parts by weight of resole resin per 100 parts by weight of resole resin and isocyanate prepolymer.

Minor amounts of acyl halide inhibitors may be present in the reaction mixtures employed in the process of this invention for the purpose of inhibiting reaction of the free-NCO groups with themselves. Such inhibitors may be employed in an amount from about 0.05 to about 1.0 parts by weight per 100 parts by weight of resole resin and isocyanate prepolymer. Preferred inhibitors include benzoyl chloride and allyl chloride.

A halocarbon blowing agent is employed in the process of this invention in an amount sufficient to produce a cellular structure in the foam. Halocarbon blowing agents are well known in the art. Useful blowing agents include low-boiling halocarbons such as monochlorodifluoromethane, dichloro-difluoromethane, 1,2-dichloro 1,1,2,2- tetrafluoroethane, 1,1,1- trichloro 2,2,2-trifluoroethane, 1,2- difluoroethane, dichloromethane and trichloro-monofluoromethane. The preferred blowing agent is trichloro-monofluoromethane.

The catalyst useful in the process of the present invention can be any organic compound of tin, antimony, cobalt or iron. For example, suitable organic tin compounds useful as catalysts include stannous salts of carboxylic acids such as stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such stannous and stannic salts as well as dialkyltin oxides, trialkyltin oxides, tin mercaptides such as, for example, di-n-octyltin mercaptide and the like. Similarly useful are organic compounds of antimony, cobalt and iron such as antimony octoate, cobalt naphthenate and ferric octoate. The preferred catalysts are the organic tin compounds. The most preferred catalyst is dibutyltin dilaurate.

It has also been found that further advantages are secured in this system when a surface active agent also is employed as an additional control over the cell size in the foam. While it has been found that the cell size using the fluorocarbons is very fine, additional improvements in uniformity and size are secured by the use of a surface active agent. Particularly useful are the nonionic types such as the polyethers and polyalcohols, such as condensation products of alkylene oxides (such as ethylene oxide and propylene oxide) with alkyl phenols, fatty acids, and like materials. Such surfactants are octadecyl phenolethylene oxide, decyl phenol-ethylene oxide sulfate and the low polymers of such materials as polyoxyethylene dodecyl phenol, octyl phenol polyethylene glycol ether, ricinoleic acid polyethylene glycolate, stearic acid polyoxyethylene glycolates, and similar polyoxyethylated fatty acids and vegetable oils as well as polyoxyethylated fatty acid esters such as polyoxyethylene sorbitan monolaurate, polyoxyethylene sorbitan tristearate, polyoxypropylene sorbitan monolaurate, polyoxy (propylene-ethylene) sorbitan monolaurate, and polyoxyethylene sorbitan pentaoleate, and polyoxyethylene sorbitan monopalmitate. Also useful as the surface active agent are copolymers including those containing a Si-O-C linkage between the siloxane and oxyalkylene moieties, as well as those containing a Si-C linkage between the siloxane and oxyalkylene moieties. Typical siloxane oxyalkylene block copolymers contain a siloxane moiety composed of recurring dimethylsiloxy groups end-blocked with monomethylsiloxy and/or trimethylsiloxy groups and with an oxyalkylene moiety composed of recurring oxyethylene and/or oxypropylene groups end-blocked with alkoxy groups. Similarly useful are: the quaternary ammonium compounds having at least two alkyl groups attached to the nitrogen atom such as cetyl dimethyl benzyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride; and sorbitan fatty acid esters such as sorbitan monolaurate, sorbitan monopalmitate, sorbitan monostearate, sorbitan trioleate and like esters.

The surface active agents useful in the process of the invention can be employed in any desired amount depending on the results that are desired. They serve to aid the nucleation for generation of smaller and more uniform cells. Preferred results seem to be secured in using amounts from 0.5 to about 5 percent by weight of the agent per 100 parts by weight of resole and isocyanate prepolymer with most preferred results at between about 0.75 to 4 percent by weight. Certain surfactants may cause collapse of the foam if employed in too great a concentration, and optimum concentration may vary with the individual surfactant selected.

The catalyst useful in the process of the invention can be employed in any desired amount as long as a catalytically effective amount is present. Generally, the catalyst is employed in an amount ranging from about 0.05 to about 10 parts by weight of catalyst per 100 parts by weight of resole and isocyanate prepolymer with best results at between 0.5 to 5 percent by weight.

It is to be understood that in the foamed resins of this invention, there may also be present other ingredients and agents to impart other desirable properties such as pigments, dyes, fillers, stabilizers, neutralizers, flameproofers and solid nucleating agents and like additives without departing from this invention. In fact, certain beneficial properties result from many such additives. For example, fluorocarbon blown foams accept and tolerate a high filler loading because of the more efficient blowing agent. Also, if desired, thermoplastic resins or modifiers such as polyvinyl alcohol, vinyl halide resins, and other similar thermoplastics can be used to improve toughness and other similar properties.

EXPERIMENTAL

The following experimental description illustrates the present invention. In the experimental description, the following abbreviations are used:

| Abbreviation | Meaning |
|---|---|
| Isocyanate Prepolymer I | A mixture containing (a) 46.7 weight percent of a quasi prepolymer prepared from tolylene diisocyanate and an oxypropylated phosphoric acid of the type described in U.S. Pat. No. 3,099,676; (b) 46.7 weight percent of a polymethylene polyphenylisocyanate having the formula: 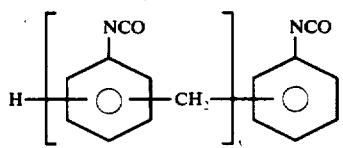 wherein x has a value from about 1.7 to about 2.3; (c) 5.9 weight percent of Flame Retardant I; (d) 0.6 weight percent of Surfactant III; and (e) 0.1 weight percent of benzoyl chloride. The resulting isocyanate terminated prepolymer has a FNCO content of 25.5 percent and a viscosity of 750 centipoise of 25° C. |
| Resole I | A phenol-formaldehyde resole having the following properties: a viscosity of about 4650 centipoise at 24° C; a pH of 5.9; a foam density specification of 2.3 pcf. and a solids content of 80 weight percent, the estimated water content being no more than about 8 weight percent. |
| Resole II | A phenol-formaldehyde resole having the following properties: a viscosity of about 2400 centipoise at 25° C; a pH of 6.5; a foam density specification of 2.0 pcf. and a solids content of 80 weight percent, the estimated water content being no more than about 8 weight percent. |
| Alkylene Glycol I | Dipropylene glycol |
| Flame Retardant I | A flame retardant having the structural formula: $(ClCH_2CH_2O)_3P=O$ Tris(2-chloroethyl)phosphate |
| Flame Retardant II | A phosphorus-containing flame retardant ("Fyrol CEF", a product of Stauffer Chemical Company) |
| Catalyst I | Dibutyltin dilaurate |
| Catalyst II | A tin mercaptide ("Carstan TG", a product of Cincinnati Milacron Chemicals Inc., Reading, Ohio) |
| Isocyanate I | A polymethylene polyphenylisocyanate ("Mondur MR", a product of Mobay Chemical Corporation) |
| Blowing Agent I | Trichloro-monofluoromethane |
| Blowing Agent II | 1,1,2-trichloro-1,2,2-trifluoroethane |
| Surfactant I | A silicone surfactant ("DC 195", a product of Dow Corning Corporation). |
| Surfactant II | A mixture comprising (a) 50 weight percent of a siloxane block copolymer having the average composition: $Me_3SiO(MeSiO)_x(Me_2SiO)_{13}SiMe_3$ $\phantom{Me_3SiO(MeSiO)_x}\vert$ $\phantom{Me_3SiO}(CH_2)_3(OC_2H_4)_7OH$ and, (b) 50 weight percent of a butanol-started poly (oxyethylene-oxypropylene) polyether mono-ol wherein the weight percent of the oxyethylene units is about equal to the weight percent of the oxypropylene units, and having a viscosity of 8.9 centistokes at 100° F. |
| Surfactant III | A siloxane block copolymer having the average composition: |

-continued

| Abbreviation | Meaning |
| --- | --- |
| | Me·SiO(Me·SiO)ₓ·(MeSiO)ᵧ·SiMe |
| | $\|$ |
| | C,H,O(C·H,O)·(C,H,O),·Me |
| EW (Equivalent Weight) | A unit basis for calculation of reactant weight ratios. It is the weight of a substance that theoretically combines with one gram of hydrogen or eight grams of oxygen, i.e. EW (Hydrogen) = 1 and EW (Oxygen) = 8. |
| FNCO (Free Isocyanate) | A measure of the EW of an isocyanate-containing material. $\% \text{ FNCO} = \frac{42}{EW} \times 100$ Expressed as the weight percent of the reactive or free isocyanate content of a substance. |

GENERAL FOAMING PROCEDURE

The foams of the examples and comparative runs were prepared following substantially the same manipulative steps. A typical procedure is as follows: The charge of resole, the isocyanate prepolymer, the silicone surfactant, and the blowing agent are weighed into a cardboard container having a capacity of one quart. The mixture is blended by stirring with an air driven motor equipped with a stainless steel shaft containing three stainless steel paddles; the temperature of this mixture is within the range of 27° to 30° C. Blending is continued until a uniform creamy mixture is obtained which state is usually achieved in 30 to 60 seconds. A preweighed amount of catalyst solution is then poured on top of the premixture and the whole stirred vigorously for 20 seconds. The resultant blend is poured into a cardboard box (8 × 8 × 6 inches), the cream and rise times (in seconds) recorded, and the foam height (in inches) measured. The cream time is taken as the time from catalyst addition until the blend visibly begins to expand. Rise time is measured from the time of catalyst addition until expansion ceases. The height of rise is measured as of the indicated rise time. The foams are allowed to stand at ambient conditions for at least 24 hours before cutting. Determination of physical properties is usually made three days after the initial foam preparation.

The compressive strength of the foam products is reported in pounds per square inch (psi.) and was determined in accordance with ASTM-D-1621.

Percentage changes in weight and volume were determined using three aging tests: percent change for cold aging was determined in accordance with ASTM-D-2126-B; percent change for dry aging was determined in accordance with ASTM-D-2126-E; percent change for humid aging was determined in accordance with ASTM-D-2126-F.

Thermal conductivity (K-factor) measurements were made at the specified foam densities in accordance with ASTM-C-518.

The core density of the foam products is reported in pounds per cubic foot (pcf.) and was determined in accordance with ASTM-D-1632.

Friability resistance was measured using a combination of ASTM-C-367 and C-421 tumbling tests, that is, the test specimens are conditioned at room temperature with 1 inch wooden cubes in accordance with ASTM-C-367, and the test time intervals (after two and eight minute periods for a total of 10 minutes) were in compliance with ASTM-C-421.

Smoke was measured according to the National Bureau of Standards' (NBS) Smoke Chamber Test. Smoke measurements using this test are expressed in terms of specific optical density, which is the optical density measured over unit path length within a chamber of unit volume produced from a specimen of unit surface area. Thus, specific optical density is dimensionless. The time to reach a critical optical density of 16 is based upon time to reach 16 percent light transmittance over a 10 foot viewing distance in a room measuring 12.5 feet × 20 feet × 8 feet.

Flammability was measured according to ASTM-D-1692-67T. Flame penetration was measured using the U.S. Bureau of Mines Flame Penetration Test. Flame spread over the foam surface was measured according to a Four Foot Tunnel Test (analogous to the 25 Foot Tunnel Test of ASTM-E-84).

The Four Foot Tunnel Test employs a test chamber consisting of a horizontal tunnel, rectangular in cross section, having an inside width of 6 inches, a depth of 6 3/16 inches measured from the bottom of the test chamber to the ledge of the inner walls on which a foam sample (47¼ inches × 7¼ inches × 1 inch sample) is supported, and a length of 4 feet. The sides of the tunnel are lined with a fire resistant insulating material, and the bottom of the tunnel consists of double-strength wire-reinforced glass. A gas flame emanating from a burner located 4 inches from one end of the foam sample is directed upward at the flame surface. Maximum flame length measurements in inches are taken, and time to reach maximum flame length in seconds is determined. From these values, an estimated rating for the 25 Foot Tunnel Test (ASTM-E-84) is determined.

The examples follow.

EXAMPLES 1 TO 6

In accordance with these examples, a series of phenolic foams were prepared employing the above-described General Foaming Procedure. Comparison Run No. C-1 corresponds to the foam formulation used in Example 1 of U.S. Pat. No. 3,872,034. Comparison Run No. C-2 corresponds to the foam formulation used in Example 4, No. 4 of U.S. Pat. No. 3,872,034. Examples 1 to 6 employ foam formulations of this invention comprised of Isocyanate Prepolymer I, Resole II, Blowing Agent I, Surfactant II, and Catalyst I.

Foam formulations and processing data for Runs C-1 and C-2 and for Examples 1 to 6 are presented in Table I. Inspection of the data of Table I indicates that foams with excellent processing characteristics can be achieved using the foam formulations of this invention. In Examples 1 to 6 the parts by weight of Resole II, Isocyanate Prepolymer I, and Blowing Agent I, are all held constant and only the amount of Catalyst I and Surfactant II is varied. By varying the amount of Catalyst I in the formulations of the invention, a range of suitable processing times can be achieved. For example, cream time ranged from 10 seconds (Examples 3–5) to 45 seconds (Example 6), rise time ranged from 40 (Example 5) to 150 seconds, and gel time ranged from 20 to 95 seconds. Thus, by changing the amount of catalyst in the foam formulations processing times are achieved that are faster or slower than those exhibited by the control formulations C-1 and C-2. It is noted that none of the foams (examples and control runs) showed shrinkage in processing. A comparison of foam properties for Runs C-1 and C-2 and Examples 1 to 6 is presented in Table II. The testing procedures utilized are described in the General Foaming Procedure above. It is to be noted that the core density of each of the foams in Examples 1 to 6 is less than the density of the foams in comparisons C-1 and C-2.

In view of the low core density provided by the foams of these examples (1.35–1.75 pcf.), it is surprising that these foams provide high compressive strengths relative to comparisons C-1 and C-2. For example, the foams of Examples 1 to 6 provide compressive strengths in a direction parallel to the foam rise ranging from 10.8 to 22.5 psi., whereas comparison foams C-1 and C-2 provide parallel compressive strengths of 7.0 and 8.2 psi., respectively. Likewise, Examples 1 to 6 provide compressive strengths in a direction perpendicular to the rise of the foam ranging from 4.0 to 12.8 psi., whereas comparison foams C-1 and C-2 provide perpendicular compressive strengths of 1.9 and 2.4 psi., respectively. Percent deflection in both the parallel and perpendicular directions was comparable for the examples and the control foams. In regard to friability resistance, the foams of Examples 1 to 6 showed substantial improvement over foam C-1. In contrast, the foams of Examples 1, 2, 4 and 6 exhibited less effective friability resistance than that provided by foam C-2. The foams of Examples 3 and 5 demonstrated friability resistance which was comparable to that of foam C-2.

Smoke density data for both the flaming and non-flaming tests is presented in Table III for comparisons C-1 and C-2 and for Examples 1 to 6. It is apparent that the foams in Examples 1 to 6 produce smoke at a lower rate (time to reach 90% maximum specific density and time to reach specific density = 16) and to a lesser extent (maximum specific density) than does the foam of comparison C-1 using both the flaming and non-flaming tests. In contrast, the foams of Examples 1 to 6 provide about the same amount of smoke (maximum specific density) as does the foam of comparison C-2, but at a faster rate (time to reach 90% maximum specific density) than provided by comparison C-2 using the non-flaming test. Using the flaming test, smoke is provided at a slower rate (time to reach 90% maximum specific density) by the foams of Examples 1 to 6 as compared to the foams of comparisons C-1 and C-2.

Tables I, II and III follow.

TABLE I

| Example No. | — | — | 1 | 2 | 3 | 4 | 5 | 6 |
|---|---|---|---|---|---|---|---|---|
| Comparison Run No. | C-1 | C-2 | — | — | — | — | — | — |
| Stream A | | | | | | | | |
| Resole II, pts. by wt. | 52.6 | 150 | 120 | 120 | 120 | 120 | 120 | 120 |
| Alkylene Glycol I, pts, by wt. | 17.4 | — | — | — | — | — | — | — |
| Flame Retardant II, pts. by wt. | 29 | 15 | — | — | — | — | — | — |
| Catalyst I, pts. by wt. | 0.3 | 0.75 | — | — | — | — | — | — |
| Surfactant I, pts. by wt. | 0.7 | 3 | — | — | — | — | — | — |
| Blowing Agent I, pts. by wt. | — | — | 20 | 20 | 20 | 20 | 20 | 20 |
| Isocyanate Prepolymer I. pts. by wt. | — | — | 180 | 180 | 180 | 180 | 180 | 180 |
| Surfactant II, pts. by wt. | — | — | 2.4 | 2.4 | 2.4 | 3.0 | 2.4 | 3.0 |
| Stream B | | | | | | | | |
| Isocyanate I, pts. by wt. | 70 | 150 | — | — | — | — | — | — |
| Blowing Agent I, pts. by wt. | 30 | — | — | — | — | — | — | — |
| Catalyst I, pts. by wt. | — | — | 0.3 | 0.1 | 0.5 | 0.5 | 0.7 | 0.1 |
| Processing Data | | | | | | | | |
| Stream ratio, A/B | 171/129 | 1/1 | 1/1 | 1/1 | 1/1 | 1/1 | 1/1 | 1/1 |
| Cream time, seconds | 15 | 15 | 20 | 40 | 10 | 10 | 10 | 45 |
| Rise time, seconds | 60 | 60 | 80 | 125 | 55 | 50 | 40 | 150 |
| Gel time, seconds | 45 | 105 | 45 | 80 | 35 | 35 | 20 | 95 |
| Rise Height, inches | 7 | 8.5 | 8 | 7 | 8.5 | 8 | 8 | 8.5 |
| Shrinkage | None | None | None | None | None | None | None | None |

The formulation of Comparative Run 1 is the same as that used in Example 1 of U.S. Pat. No. 3,872,034
The formulation of Comparative Run 2 is the same as that used in Example 2 No. 4 of U.S. Pat. 3,872,034

TABLE II

| Example No. | — | — | 1 | 2 | 3 | 4 | 5 | 6 |
|---|---|---|---|---|---|---|---|---|
| Comparison Run No. | C-1 | C-2 | — | — | — | — | — | — |
| Foam Properties | | | | | | | | |
| Core density, pcf. | 2.07 | 1.91 | 1.55 | 1.49 | 1.65 | 1.75 | 1.73 | 1.36 |
| Closed cells, % | 1.9 | 0 | 0 | 0 | 0 | 0 | 0 | 0 |
| Compressive strength, psi (25° C) | | | | | | | | |
| Parallel | 7.0 | 8.2 | 21.8 | 14.0 | 22.4 | 22.5 | 21.3 | 10.8 |
| Perpendicular | 1.9 | 2.4 | 8.1 | 4.0 | 10.0 | 9.2 | 12.8 | 3.7 |
| Deflection, % | | | | | | | | |
| Parallel | 2.7 | 3.1 | 3.0 | 2.3 | 2.6 | 2.6 | 2.5 | 3.3 |
| Perpendicular | 3.3 | 4.1 | 3.4 | 3.7 | 4.2 | 4.4 | 3.7 | 3.5 |
| Friability, % weight loss | | | | | | | | |
| After 2 minutes | 35 | 3 | 4 | 12 | 1 | 3 | 1 | 19 |
| After 10 minutes | 100 | 18 | 36 | 77 | 18 | 27 | 17 | 81 |
| After 20 minutes | 100 | 36 | 76 | 100 | 36 | 63 | 39 | 100 |
| Core density, pcf. | 2.47 | 1.90 | 1.74 | 1.61 | 1.84 | 1.96 | 1.90 | 1.71 |

TABLE III

| Example No. | 13 | — | 1 | 2 | 3 | 4 | 5 | 6 |
|---|---|---|---|---|---|---|---|---|
| Comparison Run No. | C-1 | C-2 | — | — | — | — | — | — |
| Smoke Density Test | | | | | | | | |
| *Flaming* | | | | | | | | |
| Maximum specific density, corrected | 51.92 | 37.62 | 38.22 | 39.05 | 41.33 | 45.61 | 41.93 | 35.11 |
| Time to reach 90% maximum specific density, minutes | 0.57 | 1.78 | 4.12 | 3.46 | 3.14 | 3.52 | 3.55 | 3.27 |
| Time to reach specific density = 16, minutes | 0.16 | 0.33 | 0.35 | 0.35 | 0.33 | 0.35 | 0.37 | 0.32 |
| *Non-Flaming* | | | | | | | | |
| Maximum specific density, corrected | 46.70 | 28.57 | 28.59 | 26.98 | 27.50 | 32.73 | 27.92 | 28.94 |
| Time to reach 90% maximum specific density, minutes | 1.04 | 0.90 | 0.56 | 0.48 | 0.57 | 0.59 | 0.69 | 0.45 |
| Time to reach specific density = 16, minutes | 0.26 | 0.33 | 0.36 | 0.32 | 0.35 | 0.31 | 0.37 | 0.28 |

According to NBS Smoke Chamber Test

EXAMPLES 7 TO 10

In accordance with these examples, foams of the invention were prepared using constant amounts of Resole I, Isocyanate Prepolymer I, and Blowing Agent I. The amount of Surfactant II, Catalyst I, and Catalyst II used in these examples were varied.

Formulation and processing data for Examples 7 to 10 are presented in Table IV. It is apparent that at a catalyst level of 0.5 parts by weight of the total formulation (Catalyst I used in Examples 8 and 10; Catalyst II used in Example 9) excellent cream times (23–45 seconds) and rise times (40–70 seconds) are achieved. At 0.1 parts by weight of Catalyst I (Example 7) satisfactory cream and rise times of 30 and 105 seconds, respectively, are achieved.

Foam properties for Examples 7 to 10 are presented in Table V using tests as described above under "General Foaming Procedure." It is of interest to compare the foam properties of Examples 8 to 9 which have identical foam formulations except that Example 8 employs Catalyst I and Example 9 employs Catalyst II. Although the foams of Examples 8 and 9 are both open-celled and exhibit comparable densities and compressive strengths, these foams show substantial differences in regard to humid aging, thermal conductivity, and friability. Example 8 (using Catalyst I) provides a foam which shows less weight loss and volume loss under the humid aging test than does Example 9 (using Catalyst II).

The results of the humid aging test for all of the foams of the invention are surprising in view of the fact that the expected polymer degradation by way of hydrolysis of the phosphate ester groups of the polyol component of Isocyanate Prepolymer I did not occur. In fact, the excellent dimensional stability exhibited by the foams of Examples 7 to 10 as shown by the cold aging and dry aging tests as well as the humid aging tests suggests a stabilizing effect of the phenolic resoles on the phosphate ester groups that is unexpected.

The foams of Examples 7 to 10 show excellent friability resistance, exhibiting low weight loss after two and ten minute intervals. However, as is shown in Table V, the foams of the invention are open-celled and exhibit low thermal conductivity.

Flammability test data for Examples 7 to 10 are presented in Table VI. All foams are rated self-extinguishing, having burning extents ranging from 0.4 to 1.3 inches and a burning rate ranging from 0.4 to 1.5 inches. The results of the flame penetration test for the foam of Example 7 show a flame penetration time of 1517 seconds.

Tables IV, V and VI follow.

TABLE IV

| Example No. | 7 | 8 | 9 | 10 |
|---|---|---|---|---|
| Formulation | | | | |
| Resole I, pts. by wt. | 120 | 120 | 120 | 120 |
| Isocyanate Prepolymer I, pts. by wt. | 180 | 180 | 180 | 180 |
| Blowing Agent I, pts. by wt. | 20 | 20 | 20 | 20 |
| Surfactant II, pts. by wt. | 2.4 | 2.4 | 2.4 | 3.4 |
| Catalyst I, pts. by wt. | 0.1 | 0.5 | — | 0.5 |
| Catalyst II, pts. by wt. | — | — | 0.5 | — |
| Processing Data | | | | |
| Cream time seconds | 30 | 23 | 30 | 45 |
| Rise time, seconds | 105 | 40 | 60 | 70 |

TABLE V

| Example No. | 7 | 8 | 9 | 10 |
|---|---|---|---|---|
| Foam Properties | | | | |
| Core density, pcf. | 1.36 | 1.53 | 1.48 | 1.54 |
| Closed cells, % | <33 | 0 | 0 | 0 |
| Compressive strength, psi (25° C) | | | | |
| Parallel | 14 | 23 | 20 | 16 |
| Perpendicular | 3 | 9 | 8 | 8 |
| Cold aging, % change | | | | |
| Weight loss after 14 days | 0.2 | 0.2 | 0.2 | 0.5 |
| Volume loss after 2 days | 12.4 | 1.3 | 1.1 | 0.3 |
| Volume loss after 14 days | 12.4 | 0.0 | 0.0 | 0.3 |
| Dry aging, % change | | | | |
| Weight loss after 14 days | 2.1 | 2.3 | 2.2 | 1.6 |
| Volume loss after 14 days | 9.5 | 0.4 | 1.5 | 0.8 |
| Humid aging, % change | | | | |
| Weight loss after 2 days | 3.8 | 1.7 | 4.7 | 1.5 |
| Weight loss after 7 days | 5.9 | 3.7 | 6.8 | 3.3 |
| Weight loss after 14 days | 5.7 | 4.6 | 7.8 | 4.4 |
| Weight loss after 28 days | 8.4 | 5.7 | 9.0 | 5.6 |
| Volume loss after 2 days | 3.9 | 0.8 | 3.7 | 0.3 |
| Volume loss after 7 days | 6.4 | 2.1 | 6.2 | 1.0 |
| Volume loss after 14 days | 5.4 | 3.1 | 6.7 | 3.1 |
| Volume loss after 28 days | 7.6 | 4.6 | 8.6 | 3.5 |
| Thermal conductivity (K-Factor) | | | | |
| Initial | — | 0.254 | 0.259 | — |
| Core density, pcf. | — | 1.65 | 1.45 | — |
| Friability, % weight loss | | | | |
| After 2 minutes | 6 | 2 | 7 | 10 |
| After 10 minutes | 33 | 22 | 38 | 48 |
| Core density, pcf. | 1.14 | 1.25 | 1.43 | 1.37 |

TABLE VI

| Example No. | 7 | 8 | 9 | 10 |
|---|---|---|---|---|
| Flammability | | | | |
| Core density, pcf. | 1.14 | 1.60 | 1.49 | 1.82 |
| Rating | SE | SE | SE | SE |
| Burning extent, inches | 0.5 | 0.4 | 0.4 | 1.3 |
| Burning rate, inches/minute | 0.9 | 0.4 | 0.4 | 1.5 |
| Remarks | — | — | — | — |
| Flame Penetration | | | | |
| Core density, pcf. | 1.23 | | | |
| Penetration time, seconds | 1517 | | | |

TABLE VI-continued

| Example No. | 7 | 8 | 9 | 10 |
|---|---|---|---|---|
| Weight loss, % | | 22 | | |

In accordance with ASTM-D-1692-67T
These foams are rated as self-extinguishing
Slight intumescence
In accordance with U.S. Bureau of Mines Flame Penetration Test

EXAMPLES 11 TO 13

In accordance with these examples foams were prepared employing the above-described General Foaming Procedure. These examples employ a formulation which includes Resole I, Isocyanate Prepolymer I, Blowing Agent II, Surfactant II, and Catalyst II. Catalyst II is employed in amounts of 0.1 (Example 11), 0.2 (Example 12), and 0.3 parts by weight (Example 13).

Foam formulations, processing data, and foam properties for Examples 11 to 13 are presented in Table VII. Inspection of the data of Table VII indicates that although both parallel and perpendicular compressive strength increase when the amount of Catalyst II in the formulation is increased, friability, flame penetration and flammability all increase. For example, the foam of Example 11 provided a parallel compressive strength of 10 psi, a perpendicular compressive strength of 2 psi, a friability of 15% weight loss after 10 minutes, a flame penetration time of 1490 seconds, a burning extent of 0.6 inches, and a burning rate of 1.56 inches/minute. In contrast, the foam of Example 13 (0.3 parts by weight of Catalyst II versus 0.1 for Example 11) provided a parallel compressive strength of 13 psi, a perpendicular compressive strength of 4 psi, a friability of 23% weight loss after ten minutes, a flame penetration time of 977 seconds, a burning extent of 0.9 inches, and a burning rate of 1.94 inches/minute. Thus, increases in the amount of Catalyst II present in the formulation of the present invention resulted in an increase in compressive strength and a corresponding decrease in friability resistance and flammability resistance when amounts of Catalyst II ranging from 0.1 to 0.3 parts by weight were employed.

Table VII follows.

TABLE VII

| Example No. | 11 | 12 | 13 |
|---|---|---|---|
| Formulation | | | |
| Resole I, pts. by wt. | 120 | 120 | 120 |
| Isocyanate Prepolymer I, pts. by wt. | 180 | 180 | 180 |
| Blowing Agent II, pts. by wt. | 15 | 15 | 15 |
| Surfactant II, pts. by wt. | 2.4 | 2.4 | 2.4 |
| Catalyst II, pts. by wt. | 0.1 | 0.2 | 0.3 |
| Processing Data | | | |
| Cream time, seconds | 35 | 30 | 30 |
| Rise time, seconds | 120 | 90 | 80 |
| Foam Properties | | | |
| Core density, pcf. | 1.05 | 1.08 | 1.11 |
| Closed cells, % | 0 | 0 | 0 |
| Compressive strength, psi (25° C) | | | |
| Parallel | 10 | 13 | 13 |
| Perpendicular | 2 | 3 | 4 |
| Friability, % weight loss | | | |
| After 2 minutes | 0 | 4 | 0 |
| After 10 minutes | 15 | 40 | 23 |
| Core density, pcf. | 0.95 | 1.06 | 0.95 |
| Flame Penetration | | | |
| Core density, pcf. | 1.30 | 1.22 | 1.23 |
| Penetration time, seconds | 1490 | 1122 | 977 |
| Weight loss, % | 26 | 20 | 19 |
| Flammability | | | |
| Core density, pcf. | | | |
| Rating | SE | SE | SE |
| Burning extent, inches | 0.6 | 0.8 | 0.9 |

TABLE VII-continued

| Example No. | 11 | 12 | 13 |
|---|---|---|---|
| Burning rate, inches/minute | 1.56 | 1.72 | 1.94 |

In accordance with U.S. Bureau of Mines Flame Penetration Test.
In accordance with ASTM-D-1692-67T.
These foams are rated as self-extinguishing

EXAMPLES 14 and 15

In accordance with these examples, foams were prepared using identical foam formulations comprising Resole I, Isocyanate Prepolymer I, Blowing Agent I, Surfactant II and Catalyst I. Example 14 was prepared as a horizontal rise foam in a 12 × 24 × 12 inch mold. Example 15 was prepared as a vertical rise foam in a 12 × 6 × 24 inch mold. In addition to the foam formulations, processing data and foam properties are presented in Table VIII for these examples.

It is apparent that identical cream and rise times are achieved for the foams of Examples 14 and 15. However, the foam produced by a horizontal rise (Example 14) is of higher density than that achieved by vertical rise (Example 15) (1.61 pcf. versus 1.38 pcf., respectively).

The results of the Four Foot Tunnel Test (see description under General Foaming Procedure, above) are presented in Table VIII. A comparison is made between Examples 14 and 15 and Comparison Run C-3. In Comparison Run C-3 a commercial isocyanurate foam ("Kode <25") having a density of greater than 2 pcf. was utilized. This isocyanurate foam is known to exhibit a relatively low flame spread. As expected, the results of the Four Foot Tunnel Test show Comparison C-3 foam to have flame resistant characteristics superior to those of the foams of Examples 14 to 15. For example, maximum flame length for the foam of Comparison Run C-3 is 29 inches as compared to the foams of Examples 14 and 15 which provide flame lengths of 37 and 35 inches, respectively. From the results of the Four Foot Tunnel Test predicted ratings for the Twenty Five Foot Tunnel Test (according to ASTM-E-84) are 25, 60 and 40 for Comparison C-3, Example 14 and Example 15, respectively. It is noted that all of these ratings are considered excellent when compared to those obtainable using conventional polyurethane foams.

Results of the National Bureau of Standards' (NBS) Smoke Chamber Test are presented in Table VIII for Examples 14 and 15. Particularly noteworthy are the values for time to reach the critical optical smoke density of 16 (see General Foaming Procedure, above). These values of 0.3 and 0.4 minute for Example 14 and 15 are considered to be good when compared to conventional polyurethane foams.

Table VIII follows.

TABLE VIII

| Example No. | C-3 | 14 | 15 |
|---|---|---|---|
| Formulation | | | |
| Resole I, pts. by wt. | | 480 | 480 |
| Isocyanate Prepolymer I, pts. by wt. | | 720 | 720 |
| Blowing Agent I, pts. by wt. | | 80 | 80 |
| Surfactant II, pts. by wt. | | 9.6 | 9.6 |
| Catalyst I, pts. by wt. | | 2.0 | 2.0 |
| Processing Data | | | |
| Cream time, seconds | | 30 | 30 |
| Rise time, seconds | | 60 | 60 |
| Density, pcf. | | 1.61 | 1.38 |
| Four-Foot Tunnel Test | | | |
| Maximum flame length, inches | 29 | 37 | 35 |
| Time to maximum flame length, seconds | 30 | 30 | 10 |
| Weight loss, % | 9 | 17 | 14 |

TABLE VIII-continued

| Example No. | C-3 | 14 | 15 |
|---|---|---|---|
| Predicted ASTM-E84 rating | 25 | 60 | 40 |
| Smoke Density Test | | | |
| Maximum specific optical smoke density | | | |
| Flaming | | 130 | 164 |
| Non-flaming | | 90 | 67 |
| Maximum specific optical smoke density, corrected | | | |
| Flaming | | 126 | 159 |
| Non-flaming | | 87 | 64 |
| Time to reach 90% maximum specific optical smoke density, minutes | | | |
| Flaming | | 4.3 | 4.8 |
| Non-flaming | | 2.8 | 6.5 |
| Time to reach optical smoke density = 16 minutes | | | |
| Flaming | | 0.3 | 0.4 |
| Non-flaming | | 0.3 | 0.4 |

An isocyanurate foam ("Kode <25") having a density greater than 2 pcf.
Horizontal foam rise in a mold 12 inches wide, 24 inches long and 12 inches high.
Vertical foam rise in a mold having a cross-section of 12 inches by 6 inches, and a height of 24 inches.
See Four Foot Tunnel Test under General Foaming Procedure, above.
According to NBS Smoke Chamber Test.

Examples 16 to 20 further demonstrate that the foams of the instant invention provide excellent compressive strength, low weight and volume loss upon aging, low friability and good flame resistance at core densities ranging from 1.24 pcf. (Example 16) to 1.57 pcf. (Example 18). Compressive strength in these examples ranges from 13 psi. (Example 17) to 20 psi. (Example 19) in a direction parallel to the direction of the foam rise and from 12 psi. (Example 16) to 16 psi. in a direction perpendicular to the direction of the foam rise. Percent volume loss on humid aging for a period of 28 days ranges from 4.2% (Examples 17 and 19) to 7.8% (Example 16). Percent weight loss on the friability test ranges from 0% (Example 20) to 3% (Example 17) after 2 minutes and from 5% (Example 16) to 28% (Example 17) after 10 minutes. All of the foams of Examples 16 to 20 are rated as self-extinguishing using the flammability test with extinguishing times ranging from 49 seconds (Example 16) to 60 seconds (Examples 18 and 19).

Table IX follows.

TABLE IX

| Example No. | 16 | 17 | 18 | 19 | 20 |
|---|---|---|---|---|---|
| Formulation | | | | | |
| Resole I, pts. by wt. | 120 | 120 | 120 | 120 | 120 |
| Isocyanate Prepolymer I, pts. by wt. | 180 | 180 | 180 | 180 | 180 |
| Blowing Agent I, pts. by wt. | — | — | 20 | — | 20 |
| Blowing Agent II, pts. by wt. | 15 | 15 | — | 15 | — |
| Surfactant I, pts. by wt. | 2.4 | 2.4 | 2.4 | 2.4 | 2.4 |
| Catalyst I, pts. by wt. | 0.1 | 0.1 | 0.5 | 0.1 | 0.5 |
| Processing Data | | | | | |
| Cream time, seconds | 55 | 20 | 10 | 15 | 15 |
| Rise time, seconds | 85 | 55 | 45 | 45 | 35 |
| Tack-free time, seconds | 80 | 45 | 35 | 35 | 30 |
| Foam Properties | | | | | |
| Core density, pcf. | 1.24 | 1.47 | 1.57 | 1.46 | 1.47 |
| Closed cells, % | 0 | 0 | 0 | 0 | 0 |
| Compressive strength, psi (25° C) | | | | | |
| Parallel | 14 | 13 | 16 | 20 | 17 |
| Perpendicular | 12 | 15 | 16 | 15 | 13 |
| Cold aging, % change | | | | | |
| Weight loss after 14 days | 0.0 | 0.2 | 0.3 | 0.3 | 0.2 |
| Volume loss after 2 days | 0.0 | 0.0 | 0.2 | 0.0 | 1.0 |
| Volume loss after 14 days | 1.3 | 0.2 | 0.2 | 0.0 | 1.3 |
| Dry aging, % change | | | | | |
| Weight loss after 14 days | 2.7 | 1.6 | 1.7 | 1.6 | 1.9 |
| Volume loss after 14 days | 3.5 | 2.2 | 2.5 | 1.3 | 1.2 |
| Humid aging, % change | | | | | |
| Weight loss after 2 days | 5.0 | 0.8 | 2.0 | 0.7 | 1.5 |
| Weight loss after 7 days | 7.1 | 2.3 | 4.1 | 3.1 | 3.5 |
| Weight loss after 14 days | 7.6 | 3.2 | 5.0 | 3.9 | 4.3 |
| Weight loss after 28 days | 8.7 | 2.7 | 3.2 | 4.1 | 5.1 |
| Volume loss after 2 days | 2.3 | 2.5 | 2.0 | 1.0 | 0.7 |
| Volume loss after 7 days | 3.2 | 3.4 | 4.2 | 4.2 | 3.0 |
| Volume loss after 14 days | 7.3 | 3.9 | 4.4 | 4.7 | 3.5 |
| Volume loss after 28 days | 7.8 | 4.2 | 5.7 | 4.2 | 5.4 |
| Friability, % weight loss | | | | | |
| After 2 minutes | 2 | 3 | 1 | 2 | 0 |
| After 10 minutes | 5 | 28 | 19 | 17 | 9 |
| Core density, pcf. | 1.27 | 1.32 | 1.57 | 1.48 | 1.46 |
| Flammability | | | | | |
| Rating | SE | SE | SE | SE | SE |
| Burning extent, inches | 0.8 | 1.0 | 0.5 | 0.4 | 0.6 |
| Extinguishing time, seconds | 49 | 53 | 60 | 60 | 53 |
| Burning rate, inches/minute | 1.02 | 1.15 | 0.54 | 0.43 | 0 |

In accordance with ASTM-D-1692-67T.

EXAMPLES 16 TO 20

In accordance with these examples, forms were prepared using the above-described General Foaming Procedure. These examples employ a formulation which includes Resole I, Isocyanate Prepolymer I, Blowing Agent I or Blowing Agent II, Surfactant I and Catalyst I. Blowing Agent I (20 parts by weight) and Catalyst I (0.5 parts by weight) are used in Examples 18 and 20. Blowing Agent II (15 parts by weight) and Catalyst I (0.1 parts by weight) are employed in Examples 16, 17 and 19.

What is claimed is:

1. A process for producing a rigid phenolic foam having a density of up to about 2 pcf. which comprises forming and curing a reaction mixture containing:
   (a) a liquid phenol-aldehyde resole having a viscosity from 200 to 500,000 centipoises at 25° C.,
   (b) from 35 to 75 parts by weight of a phosphorus-containing isocyanate terminated prepolymer per hundred parts of said resole and said isocyanate terminated prepolymer, (c) a catalytic amount of an organotin catalyst for the curing of the reaction mixture to produce the elastomer, (d) from 0.5 to 5.0 parts by weight of a surface active agent per hundred parts by weight of said resole and said isocyanate terminated prepolymer, and (e) a halocarbon blowing agent in an amount sufficient to produce a cellular structure in the foam.

2. A foam produced by the process of claim 1.

3. The process as claimed in claim 1 wherein the organotin catalyst is dibutyltin dilaurate.

4. A foam produced by the process of claim 3.

5. The process as claimed in claim 1 wherein the halocarbon blowing agent is a chlorofluorocarbon.

6. A foam produced by the process of claim 5.

7. The process as claimed in claim 1 wherein the halocarbon blowing agent is trichloro-monofluoromethane.

8. A foam produced by the process of claim 7.

9. The process as claimed in claim 1 wherein the halocarbon blowing agent is 1,1,2-trichloro-1,2,2-trifluoroethane.

10. A foam produced by the process of claim 9.

11. The process as claimed in claim 1 wherein there is also present 0.05 to 1.0 parts by weight of an acyl chloride inhibitor per 100 parts by weight of said resole and said isocyanate terminated prepolymer.

12. A foam produced by the process of claim 11.

13. The process as claimed in claim 11 wherein the inhibitor is benzoyl chloride.

14. A foam produced by the process of claim 13.

* * * * *

UNITED STATES PATENT OFFICE
CERTIFICATE OF CORRECTION

Patent No. 4,119,584      Dated October 10, 1978

Inventor(s) Anthony J. Papa et al

It is certified that error appears in the above-identified patent and that said Letters Patent are hereby corrected as shown below:

In column 5, lines 1-6, the formula should read:

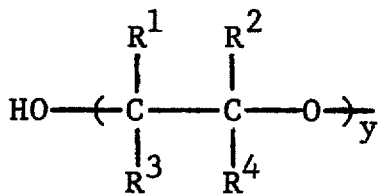

In column 5, lines 15-23, the formula should read:

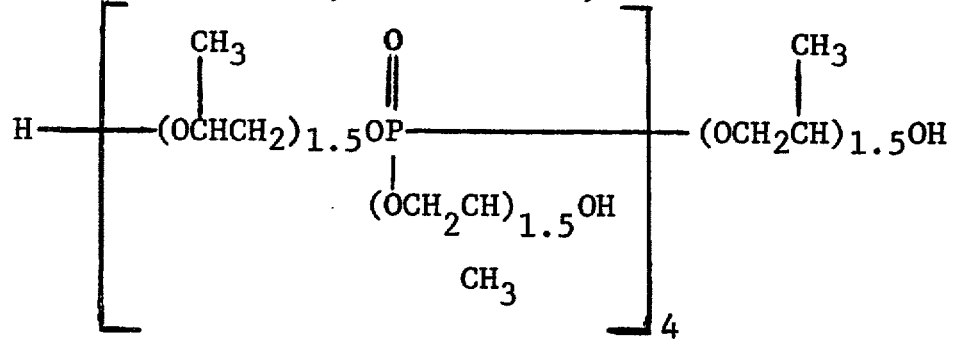

In column 8, antepenultimate line, the first word should be spelled --- viscosity ---.

In column 9, lines 3-4, the formula should read:

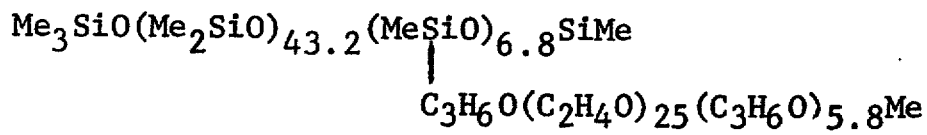

UNITED STATES PATENT OFFICE
CERTIFICATE OF CORRECTION

Patent No. 4,119,584                    Dated October 10, 1978

Inventor(s) Anthony J. Papa et al

It is certified that error appears in the above-identified patent and that said Letters Patent are hereby corrected as shown below:

In Table I, the footnotes should be numbered ---/1/--- and ---/2/---.

In Table III, Example No. "13" should read Example No. --- -- ---.

In Table III, third line, "Test" should have the superscript ---/1/---.

In Table III, the footnote should be numbered ---/1/---.

In Table VI, the footnotes should be numbered ---/1/---, ---/2/---, ---/3/---, and ---/4/---.

In Table VII, the Core density, pcf. values (antepenultimate line in column 15) should read, for Examples Nos. 11, 12, and 13, respectively, --- 1.24 ---, --- 1.19 ---, and ---1.25.

UNITED STATES PATENT OFFICE
CERTIFICATE OF CORRECTION

Patent No. 4,119,584    Dated   October 10, 1978

Inventor(s)  Anthony J. Papa et al.

It is certified that error appears in the above-identified patent and that said Letters Patent are hereby corrected as shown below:

In Table VII, the footnotes should be numbered ---/1/---, ---/2/---, and ---/3/---.

In Table VIII, line 18, "Test" should have the superscript ---/5/---.

In Table VIII, lines 23-25 should read:

corrected
        Flaming         126    159
        Non-flaming      87     64

In Table VIII, the footnotes should be numbered ---/1/---, ---/2/---, ---/3/---, ---/4/---, and ---/5/---.

UNITED STATES PATENT OFFICE
CERTIFICATE OF CORRECTION

Patent No. 4,119,584  Dated October 10, 1978

Inventor(s) Anthony J. Papa et al.

It is certified that error appears in the above-identified patent and that said Letters Patent are hereby corrected as shown below:

In column 17, line 59, the sixth word should be spelled --- foams ---.

In Table IX, the footnote should be numbered ---/1/---.

Signed and Sealed this

Twenty-seventh Day of March 1979

[SEAL]

Attest:

RUTH C. MASON
Attesting Officer

DONALD W. BANNER
Commissioner of Patents and Trademarks